United States Patent [19]
Holkeboer

[11] Patent Number: 5,852,270
[45] Date of Patent: Dec. 22, 1998

[54] METHOD OF MANUFACTURING A MINIATURE QUADRUPOLE USING ELECTRODE-DISCHARGE MACHINING

[75] Inventor: David H. Holkeboer, Byron Center, Mich.

[73] Assignee: Leybold Inficon Inc., E. Syracuse, N.Y.

[21] Appl. No.: 868,253

[22] Filed: Jun. 3, 1997

Related U.S. Application Data

[60] Provisional application No. 60/02291, filed Jul. 16, 1996.

[51] Int. Cl.$^6$ .............................. B23H 9/00; B23H 7/02; H01J 49/42
[52] U.S. Cl. ........................................ 219/69.12; 250/292
[58] Field of Search ............................. 219/69.12, 69.17; 250/292, 396 R

[56] References Cited

U.S. PATENT DOCUMENTS

| | | |
|---|---|---|
| 2,786,260 | 3/1957 | Farrand . |
| 3,271,281 | 9/1966 | Brown et al. . |
| 3,328,146 | 6/1967 | Hanlein . |
| 3,467,807 | 9/1969 | Livshits et al. . |
| 3,530,271 | 9/1970 | Ullmann et al. . |
| 3,553,451 | 1/1971 | Uthe . |
| 3,604,080 | 9/1971 | Smith . |
| 4,079,254 | 3/1978 | Lawrence, Jr. et al. . |
| 4,106,744 | 8/1978 | Lawrence, Jr. et al. . |
| 4,117,321 | 9/1978 | Meyer . |
| 4,202,080 | 5/1980 | Holzl et al. . |
| 4,213,557 | 7/1980 | Franzen et al. . |
| 4,704,532 | 11/1987 | Hua ........................................ 250/292 |
| 4,885,500 | 12/1989 | Hansen et al. . |
| 5,002,651 | 3/1991 | Shaw et al. . |
| 5,037,602 | 8/1991 | Dabiri et al. . |
| 5,063,294 | 11/1991 | Kawata et al. . |
| 5,196,665 | 3/1993 | Brifford . |
| 5,245,194 | 9/1993 | Oae et al. . |
| 5,276,328 | 1/1994 | Yoshida et al. . |
| 5,286,944 | 2/1994 | Li . |
| 5,373,157 | 12/1994 | Hiroki et al. ............................ 250/292 |
| 5,384,461 | 1/1995 | Jullien et al. ............................ 250/292 |

OTHER PUBLICATIONS

Micro Electro–Discharge Machine–Panasonic, No date.
Electrical Discharge Machine–Micro EDM, Dr. Hong Li, Sep. 1991.

*Primary Examiner*—Geoffrey S. Evans
*Attorney, Agent, or Firm*—Wall Marjama Bilinski & Burr

[57] ABSTRACT

A method for manufacturing a miniature quadrupole from a single blank includes fastening four lengthwise insulating strips into parallel slots formed in the blank. A lengthwise axial hole is cut through the blank for the guide wire used in the EDM process. The blank is machined lengthwise into four electrodes using the EDM process so that the electrodes are spaced apart in a widthwise direction and each electrode is connected to an adjacent electrode by one of the insulating strips. During the cutting, the electrodes are held in place by the insulating strips.

6 Claims, 1 Drawing Sheet

METHOD OF MANUFACTURING A MINIATURE QUADRUPOLE USING ELECTRODE-DISCHARGE MACHINING

This is a provisional application of 60/02291, filed Jul. 16, 1996.

BACKGROUND OF THE INVENTION

This application relates to a method of manufacturing of multipolar elongate electrode structures suitable for electrostatically focusing or mass-filtering a beam of charged particles, and in particular, to the manufacture of a miniature quadrupole using electrode-discharge machining (EDM).

Electrostatic lenses are used for focusing and/or filtering beams of charged particles (ions). One type of electrostatic lens, the quadrupole, is made of a plurality of parallel elongated electrodes precisely machined and spaced apart from one another. Typically, the electrodes are parallel to and equidistant from an axis along which the charged particles are traveling. Varying electric potentials are applied to each electrode so that the charged particles are directed according to their mass. The electrodes are therefore insulated from each other.

The electrodes, preferably shaped as right prisms, are cylindrical or have hyperbolic cross-sections to enhance focussing of the ions. Other configurations are optional depending on the use of the quadrupole. Although a quadrupole has four electrodes, other electrostatic lenses used to filter charged particles have configurations ranging from a dozen or more electrodes to a combination of a single rod electrode and a single 'V' angled electrode.

The electrodes for such electrostatic lenses are electrically conductive and must be held in place relative to one another while being electrically insulated. Quadrupoles in particular must have electrodes precisely aligned to ensure high transmission efficiency at high mass resolution. Precisely aligning the electrodes is difficult even when the electrodes are large. Achieving the alignment tolerances for a miniature quadrupole is especially demanding. The required precise alignment of separately prepared electrodes is exceedingly difficult to achieve with conventional methods.

Quadrupoles are typically constructed from cylindrical or hyperbolic electrodes supported by two or more ceramic ring insulators with accurately formed locations for the electrodes. Manufacturing of the ring insulators is difficult, as is accurately aligning the electrodes when the quadrupole is assembled. Several prior art methods of constructing and placing electrodes which reduce the amount of precision machining of ceramic components are described in U.S. Pat. No. 5,384,461 ("the '461 patent"), incorporated herein by reference. The '461 patent teaches aligning partly shaped electrodes together within annular ceramic rings before using EDM to shape precisely the facing surfaces of the electrodes. An alternative embodiment involves screwing or brazing an electrode blank into one or more annular ceramic insulators before using EDM. At the end of the process, the desired number of accurately separated electrodes, formed from the blank, remain attached to the annular ceramic insulators.

The construction method of the '461 patent has several disadvantages, especially when applied to making miniature quadrupoles. For instance, the manufacturer must choose between using large annular ceramic insulators, which are bulky, or using small, fragile annular ceramic insulators to hold the resulting electrodes in place.

OBJECTS AND SUMMARY OF THE INVENTION

Accordingly, an object of the present invention is to provide a method for manufacturing a quadrupole that overcomes the drawbacks and limitations of the prior art.

Another object of the present invention is to provide a method for manufacturing a quadrupole that is fast and efficient irrespective of the size of the quadrupole.

A further object of the present invention is to provide a method for manufacturing a quadrupole that produces a compact but sturdy miniature quadrupole.

Briefly stated, a method for manufacturing a miniature quadrupole from a single blank includes fastening four lengthwise insulating strips into parallel slots formed in the blank. A lengthwise axial hole is formed through the blank for the guide wire used in the EDM process. The blank is machined lengthwise into four electrodes using the EDM process so that the electrodes are spaced apart in a widthwise direction and each electrode is connected to an adjacent electrode by one of the insulating strips. During the machining, the electrodes are held in place by the insulating strips.

According to an embodiment of the invention, a method for manufacturing a miniature quadrupole includes the steps of (1) providing a single blank, (2) forming four slots in a surface of the blank, the slots being parallel to the axial hole, (3) affixing four insulating strips into the slots, one strip per slot, and (4) machining the blank lengthwise into four electrodes such that the electrodes are spaced apart in a widthwise direction and each electrode is connected to an adjacent electrode by one of the insulating strips.

According to an embodiment of the invention, a method for manufacturing a plurality of electrodes such that each electrode is separated from an adjacent electrode by an insulating strip includes (1) providing a single blank, (2) forming, parallel to the axial hole, a plurality of slots in a surface of the blank, (3) affixing a plurality of insulating strips into the plurality of slots, one insulating strip per slot, and (4) machining the blank lengthwise into the plurality of electrodes, the plurality of electrodes being both connected and spaced apart by the plurality of insulating strips.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
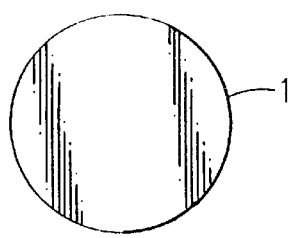
FIG. 1 is a top view of an electrode blank in a first stage of manufacture of a quadrupole according to the present invention.

Referring to FIG. 1, an electrically conductive prism, shown preferably shaped as a cylinder 1, is used as a blank from which four electrodes of a quadrupole are fashioned. Cylinder 1 is any electrically conducting material, including metals like stainless steel and molybdenum, but preferably is of a nickel-based alloy INCONEL. Cylinder 1 is optionally rectangular or other shape; a regular prism shape is conducive to EDM.

Figure 2:
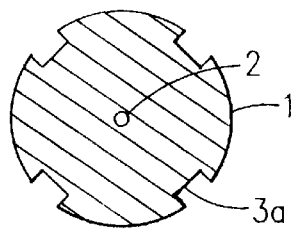
FIG. 2 is a cross-sectional view of an electrode blank in a second stage of manufacture of a quadrupole according to the present invention.
Figure 3:
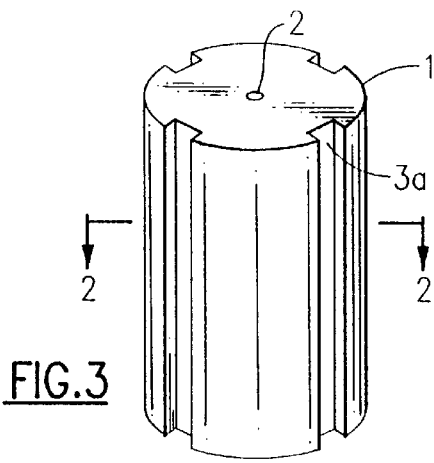
FIG. 3 is a perspective view of an electrode blank in a second stage of manufacture of a quadrupole according to a first embodiment of the present invention.

Referring to FIGS. 2 and 3, a plurality of lengthwise parallel slots 3a are conventionally formed in cylinder 1. For a quadrupole, four slots 3a are formed. Although a cross-sectional shape of slots 3a is preferably rectangular, slots 3a can be of any cross-sectional shape. An axial hole 2 is formed, preferably by drilling, lengthwise through cylinder 1 to permit insertion of a guide wire (not shown) associated with the EDM process.

Figure 4:
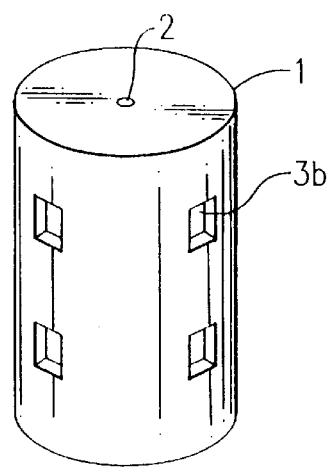
FIG. 4 is a perspective view of an electrode blank in a second stage of manufacture of a quadrupole according to a second embodiment of the present invention.

Referring to FIG. 4, a second embodiment includes a plurality of cavities 3b instead of lengthwise slots 3a as in the first embodiment. Cavities 3b are shown as square, but can be of any shape or size as long as the completed electrode structure has the required rigidity. Axial hole 2 is formed as previously described.

Figure 5:
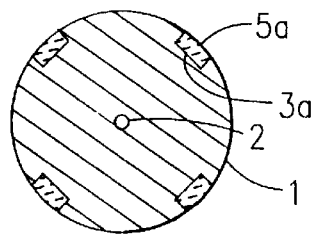
FIG. 5 is a cross-sectional view of an electrode blank in a third stage of manufacture of a quadrupole according to the present invention.

Referring to FIG. 5, an insulating strip 5a is affixed, preferably by brazing, in each slot 3a. Insulating strip 5a is any appropriate insulating material such as ceramic or aluminum oxide. Insulating strips 5a must remain unaffected by the EDM process while providing insulated support and rigidity for the completed electrode structure of the quadrupole.

Figure 6:
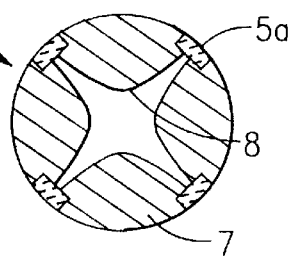
FIG. 6 is a cross-sectional view of a quadrupole produced according to the first embodiment of the present invention.
Figure 7:
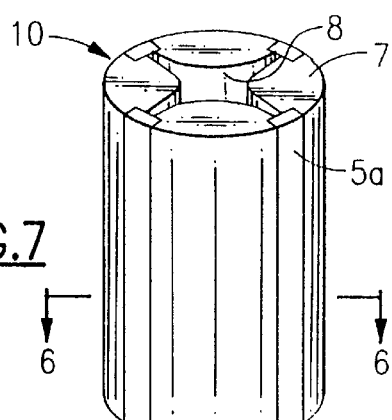
FIG. 7 is a perspective view of the quadrupole of FIG. 6.

Referring to FIGS. 6–7, cylinder 1 is cut into a quadrupole 10 by forming separate electrodes 7 using electrode-discharge machining (EDM) or other appropriate means. Insulating strips 5a remain intact during the process, thus forming the support for electrodes 7 so that each electrode 7 is positioned accurately with respect to the other electrodes 7. A hyperbolic surface 8 is preferably machined on an inside of each electrode 7 during EDM, but any desired surface shaping can be performed. By forming electrodes 7 from cylinder 1 while simultaneously shaping each electrode surface 8, the finished electrodes 7 never move with respect to each other during or after the process. The tolerances achieved are thus entirely a function of the accuracy of the EDM process.

Figure 8:
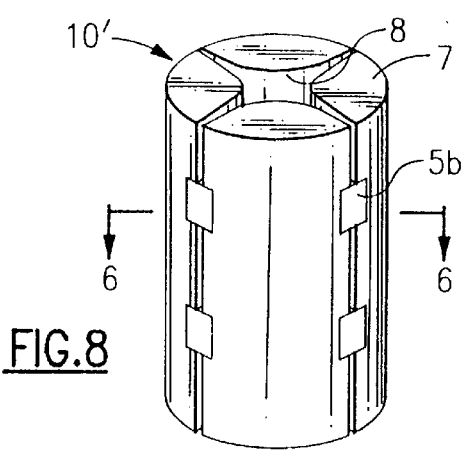
FIG. 8 is a perspective view of a quadrupole produced according to the second embodiment of the present invention.

Referring to FIG. 8, a quadrupole 10' is formed, again using EDM or other appropriate means, from the structure shown in FIG. 4. Cavities 3b are each filled with an insulating piece 5b. Several insulating pieces 5b spaced apart lengthwise perform the same function as one insulating strip 5a of the first embodiment. Quadrupole 10' is otherwise similar to quadrupole 10.

The present invention results in a much smaller and sturdier quadrupole than is achievable in the prior art processes. The product of the present invention is smaller because the insulating material does not need to be large for sturdiness and does not need to protrude past the edges of the cylinder blank. The product of the present invention is sturdier because individual insulating connecting strips hold the edges of the electrodes tightly together, so that even when the connecting strips are very small, their thickness is large relative to the distance between electrode connection points. In the prior art, long, thin annular ceramic ring portions hold the electrodes in place one to the other with distances up to a quarter of the circumference of the total insulating ring separating the connection points to the electrodes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a miniature quadrupole, comprising the steps of:

providing a single blank;

forming slots in a surface of said blank, said slots being parallel to a long axis of said blank;

affixing four insulating strips into said slots, one strip per slot; and machining said blank lengthwise into four electrodes such that said electrodes are spaced apart in a widthwise direction and each electrode is connected to an adjacent electrode by one of said insulating strips.

2. A method according to claim 1, further comprising:

drilling an axial hole lengthwise through said blank; and said step of machining includes using electrode-discharge machining.

3. A method for manufacturing a plurality of electrodes such that each electrode is separated from an adjacent electrode by an insulating strip, comprising:

providing a single blank;

forming, parallel to a long axis of said blank, a plurality of slots in a surface of said blank;

affixing a plurality of insulating strips into said plurality of slots, one insulating strip per slot; and machining said blank lengthwise into said plurality of electrodes, said plurality of electrodes being both connected and spaced apart by said plurality of insulating strips.

4. A method according to claim 3, further comprising:

drilling an axial hole lengthwise through said blank; and said step of machining includes using electrode-discharge machining.

5. A method according to claim 3, wherein each of said plurality of slots extends a full length of said blank.

6. A method according to claim 3, wherein at least two of said plurality of slots extend less than a full length of said blank and are disposed in a same line parallel to said long axis of said blank.

* * * * *